United States Patent [19]
Tsujimoto

[11] Patent Number: 5,636,242
[45] Date of Patent: Jun. 3, 1997

[54] DIVERSITY TRANSMITTER/RECEIVER

[75] Inventor: Ichiro Tsujimoto, Tokyo, Japan

[73] Assignee: NEC Corporation, Tokyo, Japan

[21] Appl. No.: 582,412

[22] Filed: Jan. 3, 1996

[30] Foreign Application Priority Data

Jan. 11, 1995 [JP] Japan ................... 7-002741

[51] Int. Cl.$^6$ ................................. H04K 1/00
[52] U.S. Cl. ................. 375/200; 375/267; 375/299; 375/347
[58] Field of Search ................. 375/299, 347, 375/200, 201, 206, 267, 260; 455/101, 103

[56] References Cited

U.S. PATENT DOCUMENTS

| 4,881,241 | 11/1989 | Pommier et al. | 375/260 |
| 4,943,976 | 7/1990 | Ishigaki | 375/206 |

FOREIGN PATENT DOCUMENTS

| 63-121332 | 5/1988 | Japan . |
| 4-167829 | 6/1992 | Japan . |
| 65199206 | 8/1993 | Japan . |

OTHER PUBLICATIONS

"Combination of an Adaptive Array Antenna and a Canceller of Interference for Direct–Sequence Spread–Spectrum Multiple–Access System", R. Kohno et al., IEEE Journal, vol. 8, No. 4, May 1990 pp. 675–682.
*Principles of Secure Communications Systems*, 2nd Ed., Don J. Torrier, pp. 78–81; pp. 134–147.

Primary Examiner—Stephen Chin
Assistant Examiner—Kevin Kim
Attorney, Agent, or Firm—Sughrue, Mion, Zinn, Macpeak & Seas

[57] ABSTRACT

After coding transmission data by means of an error-correction coder, the data are divided into N branches, pass through a plurality of delay elements, undergo interleaving in an interleave circuit, primary modulation in a modulator, undergo spread-spectrum processing in a spread-spectrum circuit, and are coded/multiplexed in a synthesizer, and finally transmitted. The signals transmitted by the transmitter are divided into N branches by a branch circuit, undergo inverse spread-spectrum processing in inverse spread-spectrum circuits, undergo demodulation in a demodulator corresponding to the primary modulation on the transmission side, undergo de-interleaving at a de-interleave circuit, and after delay coordination at delay elements, undergo majority-discrimination at a majority-discrimination circuit, and finally are error corrected in an error-correction decoding circuit.

15 Claims, 9 Drawing Sheets

FIG. 1A
PRIOR ART
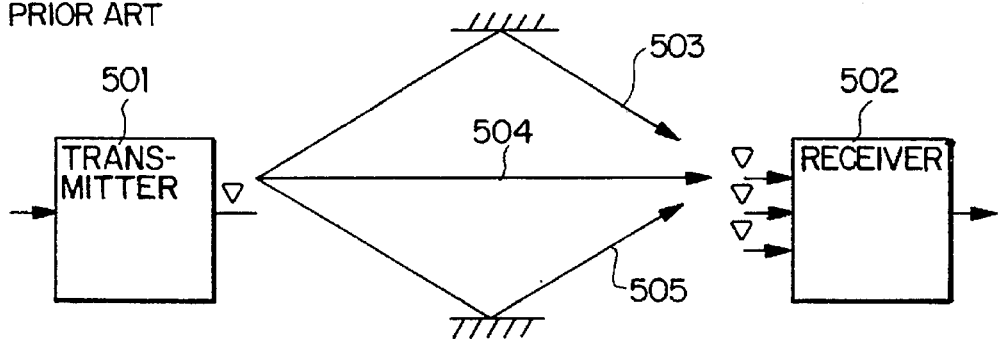
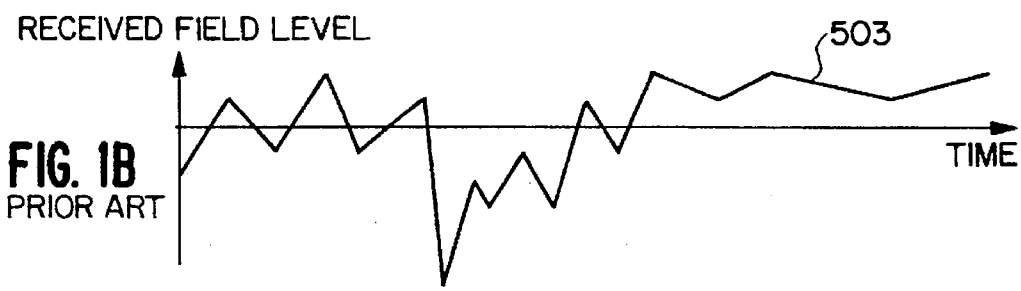
FIG. 1B PRIOR ART
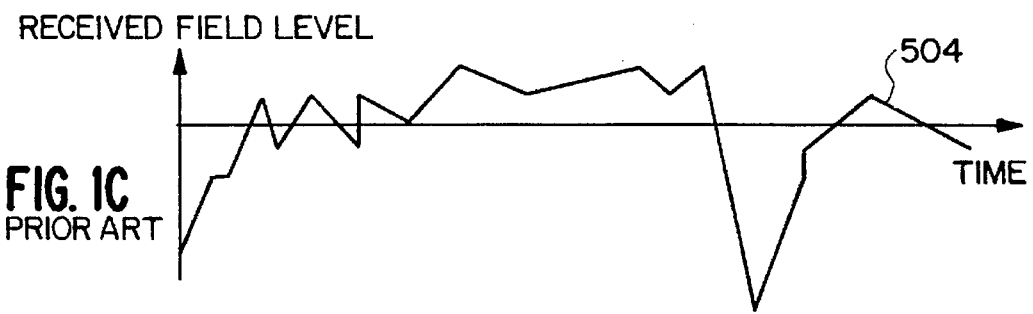
FIG. 1C PRIOR ART
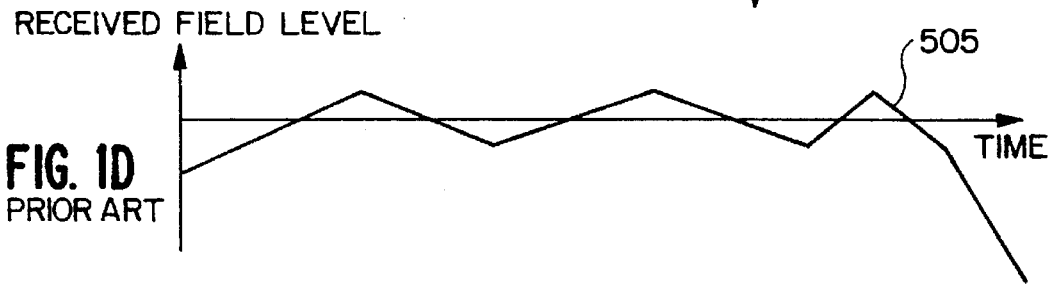
FIG. 1D PRIOR ART
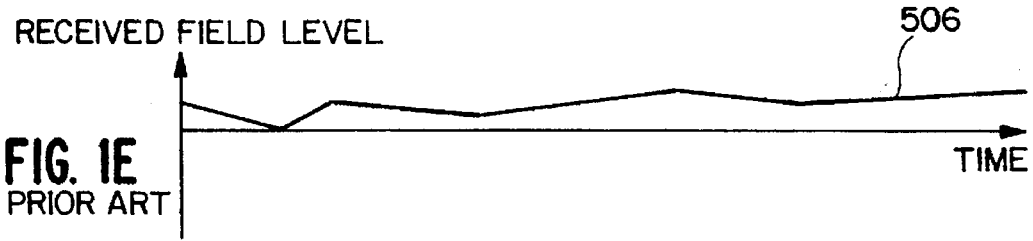
FIG. 1E PRIOR ART

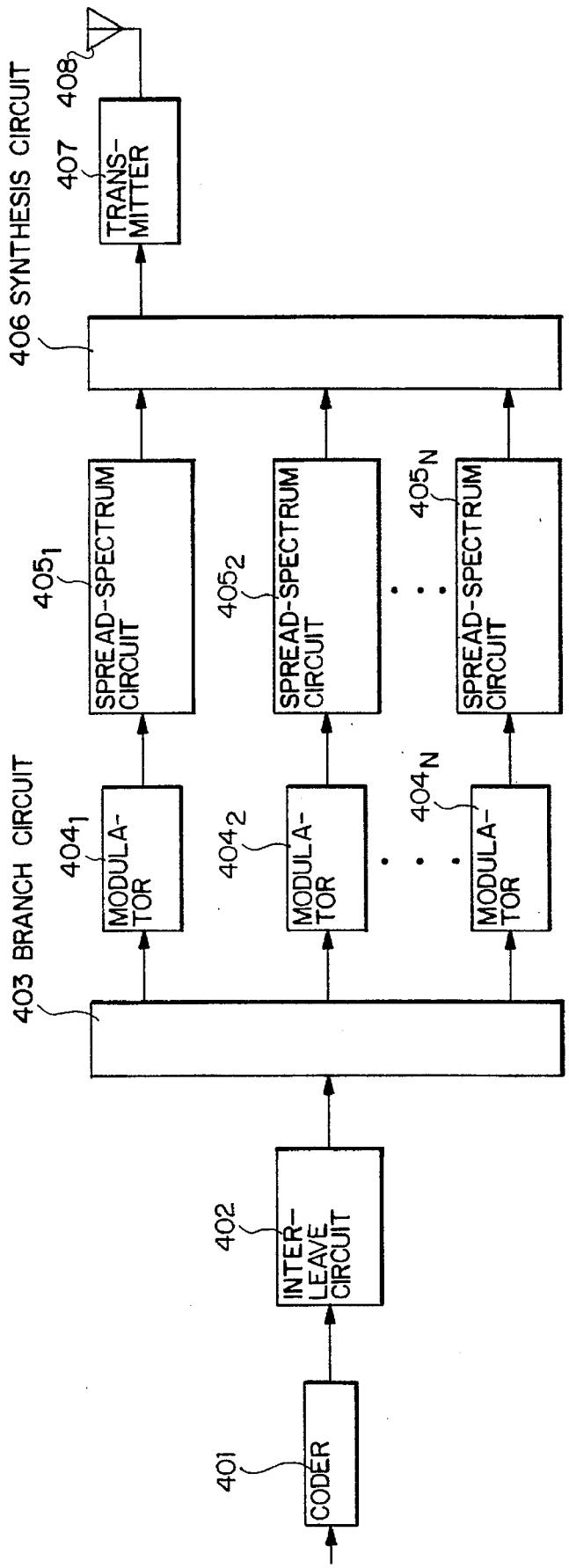

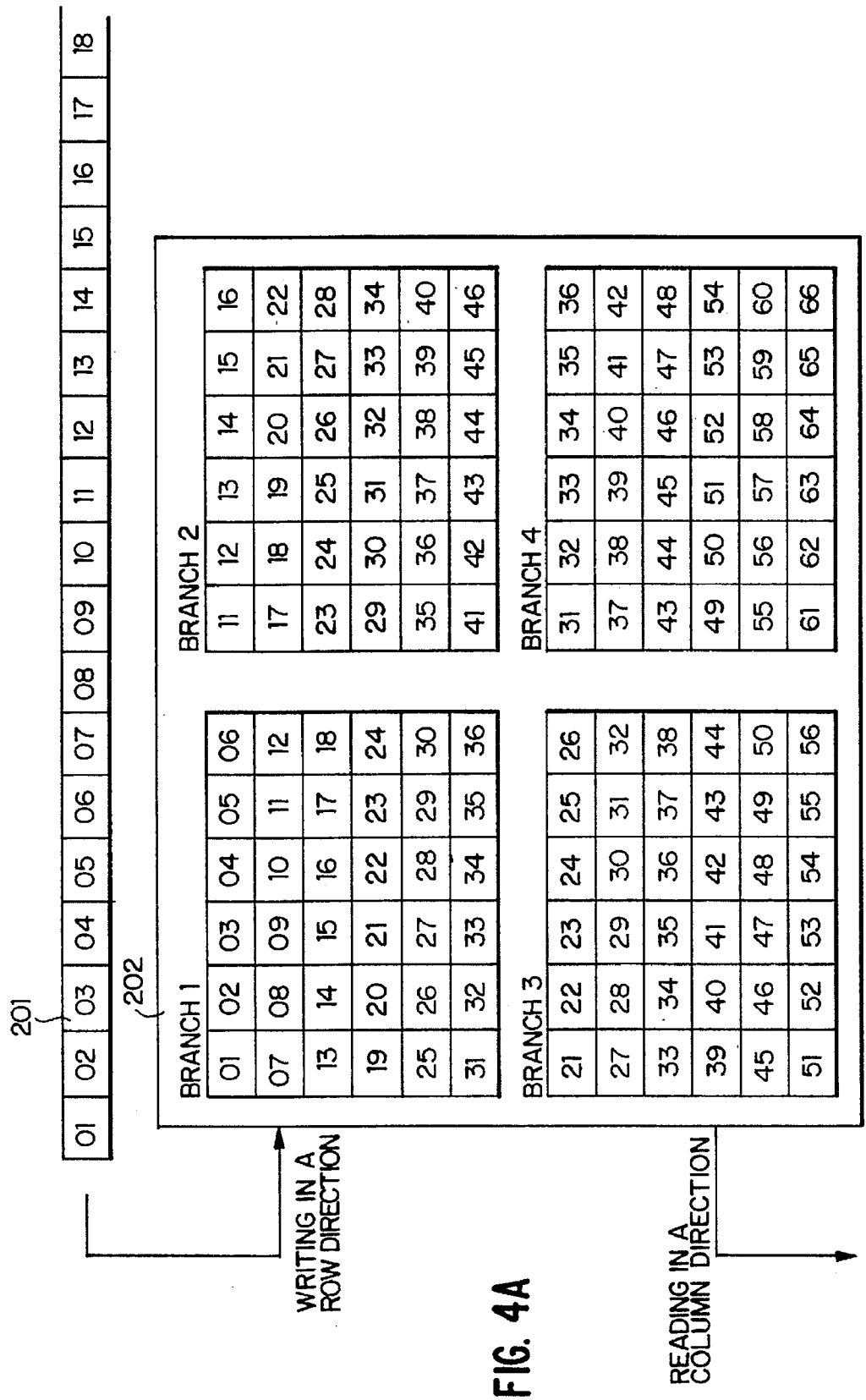

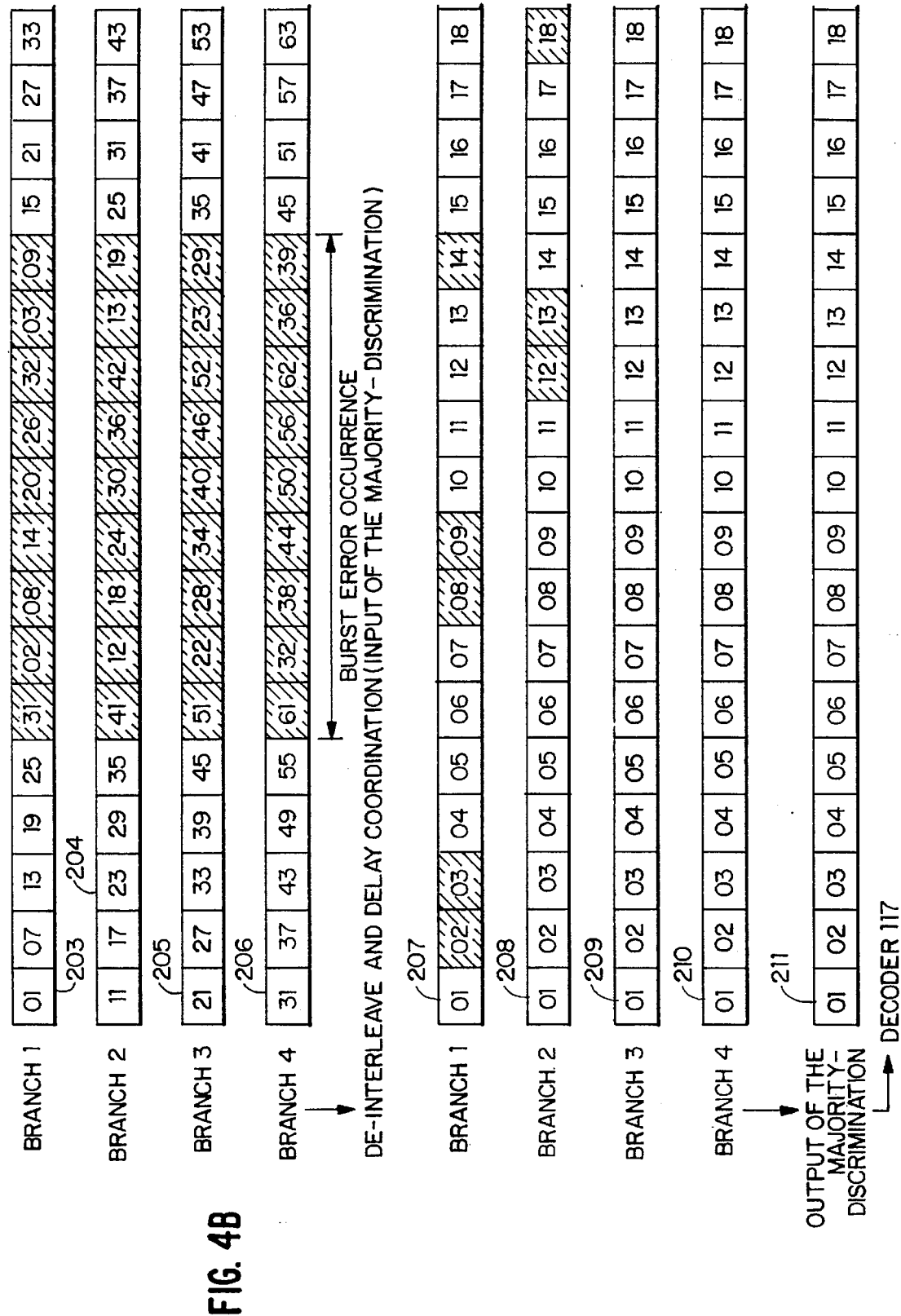

DIVERSITY TRANSMITTER/RECEIVER

BACKGROUND OF THE INVENTION

1. Field of the Invention:

The present invention relates to a diversity transmitter/receiver, and in particular, to a diversity transmitter/receiver which uses spread-spectrum coded multiplexing with interleaving error correction for digital radio transmission in which severe multipath fading is frequently a problem.

2. Description of the Related Art:

Diversity receiving is generally required for fading lines in radio communication. Fading can be broadly divided between flat fading and selective fading. In flat fading, multipath propagation does not occur, but rather, the directly received waves themselves undergo fluctuations in amplitude and phase during propagation. In selective fading, on the other hand, multipath propagation occurs and each of the waves arriving by multipath independently undergo fluctuations in amplitude and phase. In this case, the received signal is a synthesized wave made up of the plurality of multipath waves, and therefore, may result in inverse-phase synthesis at particular frequencies due to phase fluctuation conditions. In other words, selective fading (notches) may occur at frequencies within the received spectrum. While the received waveform itself undergoes no distortion in the case of the above-described flat fading, fluctuation in the reception level becomes a problem. In the case of selective fading due to multipath, however, fluctuation in reception level as well as distortion in the received waveform occurs.

Diversity receivers and adaptive equalizing techniques have been used in the prior art to deal with the above-described fading line. While these include various methods, we will here take up as the prior art spread-spectrum transmission, which has been found to be effective against multipath distortion. Spread-spectrum transmission has been used for military applications for achieving robust transmission despite interference waves. However, multipath waves, which have a long delay time, have low correlation with the principal-wave signal. If spread spectrum is applied in such a case, the multipath waves do not correlate with the diffusion coding and are suppressed by the inverse diffusion operation. Essentially, spread spectrum treats multipath waves as interference and can be considered a type of adaptive equalizer. Multipath waves of short delay time, however, have a high correlation with the principal-wave signal and therefore should not be suppressed by inverse diffusion. In this case, the small delay time between the multipath wave and principal wave results in potential fade-out of the received signal due to inverse synthesis. A diversity receiver that uses the non-correlation between a plurality of propagation paths serves as an effective measure against such fade-out.

FIG. 1A illustrates the principles of diversity transmission and reception, while FIGS. 1B, 1C, and 1D show fluctuations in the received field levels of diversity paths 503, 504, and 505, respectively. FIG. 1E shows the fluctuations in received field level for the output (combined diversity) of receiver 502.

Transmitter 501 is assumed to employ one nondirectional antenna for transmission. A model will be considered in which multipath propagation occurs, and radio waves emitted by a nondirectional antenna are propagated along paths including diversity path 504, which is a direct propagation path, and diversity paths 503 and 505, which are reflected waves. In such a case, the paths differ spatially and fading therefore occurs independently for each path to produce the fluctuations in received field level shown in FIGS. 1B, 1C, and 1D. Diversity reception for coping with such a case decreases the probability of fade-out by synthesizing (FIG. 1E) or by selecting portions of each of the diversity branches where fade-out does not occur. This form of diversity takes advantage of the noncorrelation between the propagation paths, and is therefore termed diversity or path diversity. As a means of realizing this path diversity, an adaptive array employing, for example, a plurality of antennas is generally adopted. In other words, a plurality of arriving multipath waves are extracted through directional control of an adaptive array, and diversity synthesis is enabled by maximum ratio synthesis.

FIG. 2 shows the configuration of a spread-spectrum diversity transmitter/receiver in which spread spectrum is combined with diversity, FIG. 2A showing the transmitter and FIG. 2B showing the receiver.

The transmitter is composed of error-correction coder 401, interleave circuit 402, branch circuit 403, N modulators $404_1$–$404_N$, N spread-spectrum circuits $405_1$–$405_N$, synthesis circuit 406, transmitter 407, and transmission antenna 408.

The receiver is composed up of N reception antennas $409_1$–$409_N$, N receivers $410_1$–$410_N$, N inverse spread-spectrum circuits $411_1$–$411_N$, diversity synthesis circuit 412, demodulator 413, de-interleave circuit 414, and decoder 415.

The prior art shown in FIG. 2 does not relate specifically to any reference and is simply a combination of coded multiplexing through a spread spectrum, normal diversity synthesis and interleave error correction. For further details regarding each of spread spectrum, diversity, or interleave error correction of the prior art, reference may be made to texts such as "Principles of Secure Communication Systems" by Don J. Torrieri (Artech House).

In the transmitter, error-correction coder 401 and interleave circuit 402 perform coding for-burst error correction. The coded data are split into N branches at branch circuit 403, subjected to primary modulation at modulators $404_1$–$404_N$, and further diffused at spread-spectrum circuits $405_1$–$405_N$. Coding/multiplexing is then performed at synthesis circuit 406 using independent diffusion codes for each branch. In other words, N branches of coded multiplexed channels are used in the diversity transmission. Each synthesized wave is transmitted from transmission antenna 408 by way of transmitter 407.

At the receiver, the N branches of signals received at N reception antennas $409_1$–$409_N$, pass through receivers $410_1$–$410_N$, and are inverse spreading at inverse spread-spectrum circuits $411_1$–$411_N$ using the diffusion code relevant to each transmission-side branch. These operations result in the extraction and separation of N branches of signals which are then inputted to diversity synthesis circuit 412. It must be noted here that in order to effect diversity, the signal of each branch must have no correlation. More concretely, the N reception antennas must each receive and extract differing multipath waves arriving from different angles. In some cases, noncorrelation between the antennas cannot be guaranteed by installed spacing of the N reception antennas $409_1$–$409_N$. For example, in the case of an adaptive antenna set up at an integer power of a half-wavelength of the radio frequency, correlation occurs between the received signals of antenna elements. In such a case, it is necessary to provide N subarray processors in the section following receivers $410_1$–$410_N$, and to extract signals through N buses using N equivalent antenna beam controls. There are no references directly relating to this process, but a combination of the adaptive array and spread-spectrum methods for eliminating interference waves is proposed in "Combination of Adaptive Array Antenna and a Canceller of Interference for Direct-Sequence Spread Spectrum Multiple Access System" by R. Kohno et al. (IEEE Journal of Selected Areas in Communications, Vol. 8 No. 4, May 1990).

Various methods exist for diversity synthesis circuit 412, including a linear synthesis type using an adaptive filter and a type that performs switching diversity. An example of the synthesis type of the prior art is described in Japanese Patent Laid-open No. 167829/1992. In this publication, the relation between discrimination data of a demodulator and branch intervals is used to carry out spread-spectrum diversity synthesis. Demodulator 413 demodulates the primary modulation of the transmitting side, and de-interleave circuit 414 and decoder 415 execute burst error-correcting. Burst error-correction is adopted in the prior art shown in FIG. 2, but because hits tend to occur in a multipath fading propagation path, this is used for dealing with burst errors.

In the above-described prior art, noncorrelative diversity branch received waves are extracted, and therefore, an adaptive array or an adaptive diversity synthesis construction using a plurality of antennas is necessary for effecting diversity synthesis. Accordingly, reception antennas and receivers are required in a number equal to the number of diversity branches, resulting in the drawback of increased scale of the receiving side apparatus. FIG. 1 illustrates one example of multipath routes, but multipath caused by reflectors vary according to the substance of the reflectors themselves, and multipath conditions are not always constant, particularly in land mobile communication. In other words, it cannot be assumed that multipath always exists, and in such cases, there is the problem that decrease of diversity branch degree is accompanied by loss of the path diversity effect.

SUMMARY OF THE INVENTION

The object of the present invention is to provide a spread-spectrum diversity transmitter/receiver having a limited scale and moreover, that ensures constant and stable diversity branches.

The first spread-spectrum diversity transmitter/receiver according to the present invention includes:

a transmitter that includes error-correction coding means for error-correction coding data to be sent, delay means for conferring differing delay times for each branch signal derived by dividing output of the error-correction coding means into a plurality of branches, interleave means for interleaving each branch output of the delay means, modulating means for individually modulating each branch output of the interleave means, spread-spectrum means for spreading the spectrum of each branch output of the modulating means by differing diffusion codes, synthesizing means for synthesizing and coding/multiplexing the output of the spread spectrum means, and transmitting means for transmitting the coded/multiplexed signal; and a receiver that includes receiving means for receiving the coded/multiplexed signal, branching means for branching the received signal, inverse spread-spectrum means for inverse-spreading the spectrum of each branch signal by means of the plurality of diffusion codes of the transmitting side, demodulating means for individually demodulating each of the received signals of the plurality of branches that have been coded and separated by the inverse spread-spectrum means, de-interleave means for executing de-interleaving which is the reverse of interleaving of the transmitting side upon the plurality of demodulated branches of received signals, delay means for delay coordination of each branch output of the de-interleave means by conferring differing delay times so as to absorb delay differences between branches conferred by the delay means of the transmitting side, majority-discriminating means for majority discrimination of each branch signal derived by the delay means, and error-correction decoding means for performing error-correction decoding of the discrimination data of the majority-discriminating means.

A second spread-spectrum diversity transmitter/receiver according to the present invention includes:

a transmitter that includes delay means for conferring differing delay times on each branch signal derived by branching data to be transmitted into a plurality of branches, interleave means for interleaving each branch output of the delay means, modulating means for individually modulating each branch output of the interleave means, spread spectrum means for spreading the spectrum of each branch output of the modulating means by differing diffusion codes, synthesizing means for synthesizing and coding/multiplexing the output of the spread spectrum means, and transmitting means for transmitting the coded/multiplexed signal; and a receiver that includes receiving means for receiving the coded/multiplexed signal, inverse spread spectrum means for branching the received signals and executing inverse spread spectrum by means of the plurality of diffusion codes of the transmitting side, demodulating means for individually demodulating each of the received signals of the plurality of branches that have been coded and separated by the inverse spread spectrum means, de-interleave means for executing de-interleaving which is the reverse of interleaving of the transmitting side upon the plurality of demodulated branch received signals, delay means for delay coordination by conferring differing delay times for each branch output of the de-interleave means so as to absorb the delay differentials between branch signals conferred by the delay means of the transmitting side, and majority-discriminating means for majority discrimination of each branch signal derived by the delay means.

The present invention realizes a spread-spectrum diversity transmitter/receiver through a combination of time diversity, which uses coding/multiplexing, and burst-error correction, which uses interleaving, and does not employ frequency diversity, which expands the frequency bandwidth, or space diversity, which depends on multipath routes.

The first spread-spectrum diversity transmitter/receiver according to the present invention not only uses interleaving to randomize burst error arising from, for example, hits resulting from multipath fading, but also uses delay differential processing to randomize the effect of burst error among the diversity branches, and in addition, uses diversity branches to suppress random error through a majority discrimination process. This is a time diversity operation, and majority discrimination is equivalent to diversity synthesis or diversity switching synthesis. Consequently, diversity receiving through coding/multiplexing is enabled in spread-spectrum transmission without employing frequency diversity or space diversity through a plurality of fixed antennas or an adaptive array.

In the second spread spectrum diversity transmitter/receiver, the error-correction coding means and the error-correction decoding means have been eliminated from the first spread spectrum diversity transmitter/receiver. As explained hereinabove, in the first spread spectrum diversity transmitter/receiver, delay differential processing for every diversity, interleave processing, and majority discrimination processing have the effect of suppressing bit error. This bit error cannot always be assumed to be entirely eliminated, but by increasing the diversity branch number N, it is clear that the bit error ratio can be significantly improved through majority discrimination. In such a case, therefore, line quality can be ensured even if error-correction processing is omitted. As a result, the error-correction coding means and error-correction decoding means have been eliminated in the second spread spectrum diversity transmitter/receiver. In this case, because the additional bits for error correction are unnecessary and the signal bandwidth need not be increased, line quality can be maintained through diversity alone. This is advantageous in terms of effective use of frequency in consideration of a case in which frequency resources are limited.

The above and other objects, features, and advantages of the present invention will become apparent from the following description with reference to the accompanying drawings which illustrate examples of the present invention.

BRIEF DESCRIPTION OF THE DRAWINGS

FIG. 1A illustrates the basic principle of a diversity transmitter/receiver;

FIGS. 1B–1E show fluctuations in the electrical field level of received signals of diversity paths 502, 503, 504, and 505;

FIGS. 2A and 2B show the configurations of a transmitter and receiver of a diversity transmitter/receiver of the prior art;

FIG. 4 illustrates that the diversity synthesis effect can be obtained in the first embodiment.

DETAILED DESCRIPTION OF THE PREFERRED EMBODIMENTS

Figure 3A:
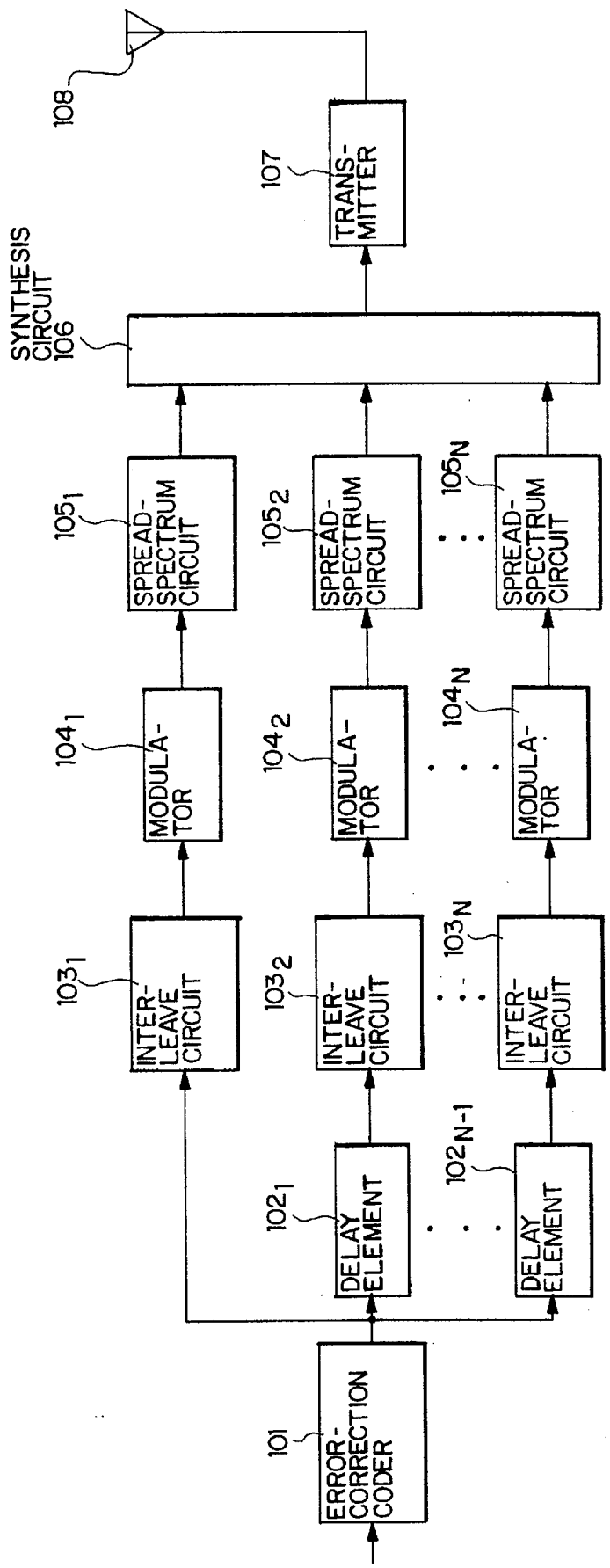
FIGS. 3A and 3B show the configurations of a transmitter and receiver of a diversity transmitter/receiver according to the first embodiment of the present invention.
Figure 3B:
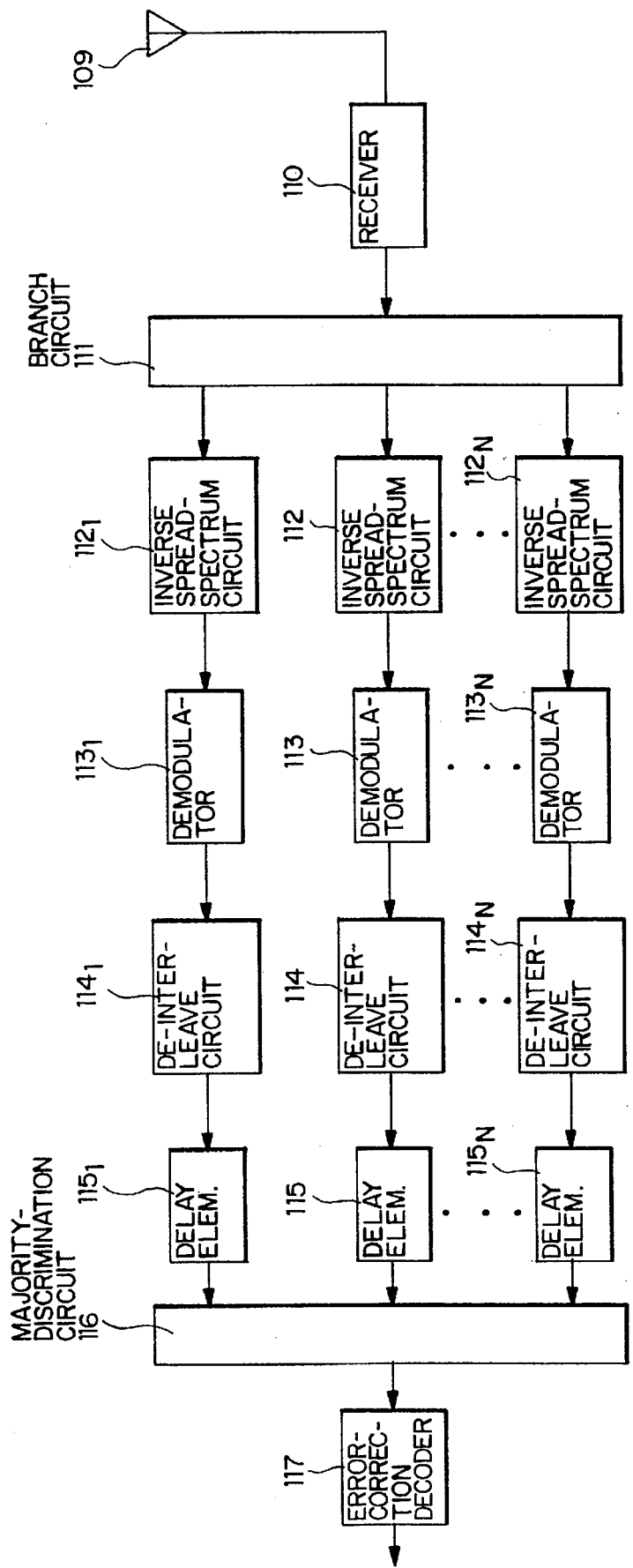

FIG. 3 shows the construction of a spread spectrum diversity transmitter/receiver according to the first embodiment of the present invention, and FIG. 4 illustrates the operation of the embodiment.

The transmitter (FIG. 3A) is composed of an error-correction coder 101, (N−1) delay elements $102_1$–$102_{N-1}$, N interleave circuits $103_1$–$103_N$, N modulators $104_1$–$104_N$, N spread spectrum circuits $105_1$–$105_N$, a synthesis circuit 106, a transmitter 107, and transmission antenna 108.

The receiver (FIG. 3B) is composed of a receiving antenna 109, receiver 110, branch circuit 111, N inverse spread-spectrum circuits $112_1$–$112_N$, N demodulators $113_1$–$113_N$, N de-interleave circuits $114_1$–$114_N$, N delay elements $115_1$–$115_N$, majority discrimination circuit 116, and error-correction decoder 117.

In the transmitter, transmission data are coded by error-correction coder 101, divided into N branches, and then passed on to delay elements $102_1$–$102_{N-1}$. Here, branch 1 is set as a non-delayed branch. The second branch receives a delay of τ2 at delay element $102_2$, and the Nth branch receives a delay of τN at delay element $102_{N-1}$. Here, delay times τ2, τ3,—τN are all different from each other. At interleave circuits $103_1$–$103_N$ of the following section, each branch undergoes interleave processing. Here, the interleave period may be equal for all branches and may differ for every branch. The present explanation will deal with a case in which the interleave period for all branches is the same. The output of interleave circuits $103_1$–$103_N$ next undergoes primary modulation by modulators $104_1$–$104_N$. The modulation method is assumed to be a quadrature modulation such as BPSK or QPSK. The N branches of modulated waves are next diffused by spread-spectrum circuits $105_1$–$105_N$, the diffusion codes used here differing for each branch. Coding/multiplexing is next performed at synthesis circuit 106 and the signals are finally transmitted through transmitter 107 and transmission antenna 108.

Figure 2B:
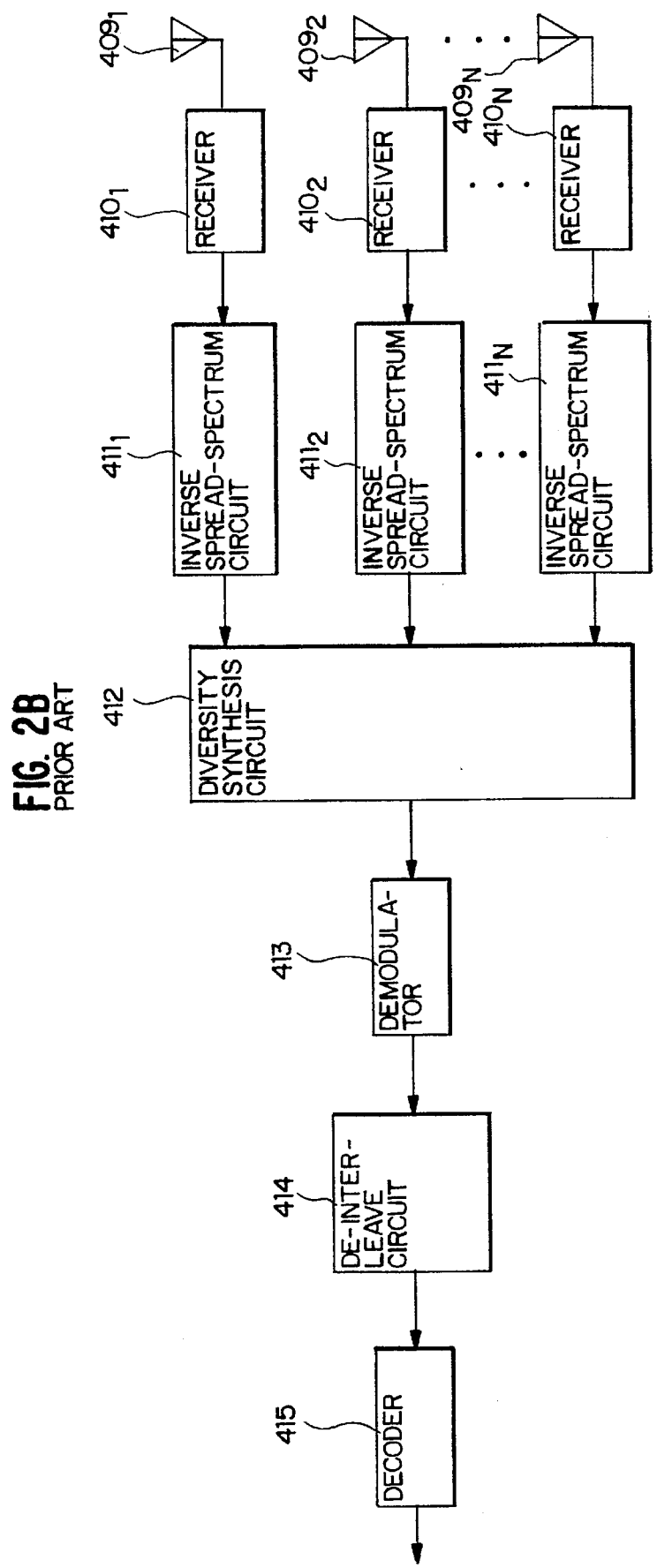

At the receiver, rather than using N receiving antennas and N receivers as described in the prior art of FIG. 2, receiving is performed by one receiving antenna 109 and one receiver 110. The waves received by receiver 110 are divided into N branches by branch circuit 111, and inverse diffused by inverse spread-spectrum circuits $112_1$–$112_N$. Here, by carrying out inverse diffusion using the same diffusion codes as used in the transmitter, coded/multiplexed modulated waves can be separated and extracted for every branch. Demodulators $113_1$–$113_N$ of the following section demodulate according to the primary modulation performed in the transmitter. The data signals determined at the modulators are de-interleaved at de-interleave circuits $114_1$–$114_N$, and after further undergoing delay coordination at delay elements $115_1$–$115_N$, are subjected to majority-discrimination at majority-discrimination circuit 116. The output of this circuit 116 finally undergoes error correction at error-correction-decoder 117.

Next, FIG. 4 will be used to explain how the diversity synthesis effect is obtained through the above-described operation. In this case, N=4.

Transmission data string 201, which is the output of error-correction coder 101, is divided into four branches and delay time differentials between the branches are applied through delay elements $101_1$–$102_3$. Here, the delay time differential between each of the branches is assumed to be a length of 10 bits. The four branches of transmission signals to which 10-bit delay differentials have been applied next undergo interleave processing at interleave circuits $103_1$–$103_4$, the interleave period being assumed to be 6×6= 36 bits. In this case, transmission data series 201 is written into an interleave memory for each branch according to interleave processing 202, as shown in the figure. According to normal interleave processing, data are written into an interleave buffer memory configured as a matrix in a row direction (or column direction), and conversely, reading is carried out in a vertical column direction (or row direction), thereby sorting (interleaving) bits. Here, data are written into the interleave matrices corresponding to the four branches derived from delay elements $102_1$–$102_4$ with 10-bit delay differentials between each branch. For example, data "01" is written into row 1 column 1 of the memory for branch 1, and at the same time, data "11" is written to row 1 column 1 for branch 2, data "21" is written to row 1 column 1 for branch 3, and data "31" is written to row 1 column 1 for branch 4. When these data are read out for each branch in the column direction, the output data series will be as shown in 203–206. The four branch signals of these output data series 203–206 are coded/multiplexed and transmitted. In this example, the coded/multiplexed signals are frequency-converted to a radio frequency and transmitted by transmitter 107.

It must be noted here that the four diversity branches are transmitted by coding/multiplexing at the same radio frequency. Furthermore, one antenna is used for both transmitting and receiving, space diversity not being employed. The four diversity branch signals are propagated over the same spatial path, and accordingly, rather than being non-correlative, each received branch signal has a correlation of 1. In other words, when a hit occurs due to multipath fading on the propagation path, each of the diversity branches simultaneously receives a burst error. Such a burst error is indicating by the hatched portions of each series shown in 203–206.

At the receiver, de-interleave processing is carried out for each of the branch signals 203–206. In this case, de-interleaving is the reverse operation of interleaving on the transmitting side whereby the received data are written to a buffer matrix for each branch in a column direction (or row direction) and read out in a row direction (or column direction).

Furthermore, because delay differentials were applied between the branches by delay elements $102_1 102_{N-1}$ on the transmitting side, these delay differentials must be absorbed on the receiving side. For this purpose, the output of de-interleave circuits $114_1$–$114_N$ undergoes delay coordination by delay elements $115_1$–$115_N$, whereby the signal series sequence for each diversity branch coincides.

The received signal series 203–206 are sorted by the above de-interleave and delay coordination as shown in 207–210, thus randomizing on the time axis any burst error occurring on the propagation path. Looking at 204 of the first branch and 208 of the second branch, for example, it can be seen from the hatched portions in the figure that burst error received on the propagation path has been converted to random error. Furthermore, the positions at which random error occurs in branch 1 and branch 2 do not coincide. On the other hand, random error in 209 of branch 3 and 210 of branch 4 does not appear in the figure, because the random error of branches 3 and 4 occurs after the passage of more than 20–30 bits after the series shown in the figure. In other words, conferring delay differentials between the branch signals and interleaving has the effect not only of randomizing the burst error but of preventing the coincidence of the position of the randomized bit errors among the diversity branches. Branch signals 207–210 undergo majority discrimination at majority-discrimination circuit 116 of FIG. 3. Essentially, the majority is taken among branches in which bit error occurs and branches in which bit error does not occur, and the information bits in branches agreeing with the most branches is determined to be the correct data. Among branch signals 207–210, only branches 1 and 2 have series in which bit error occurs, but even here, the bit error does not occur simultaneously, and therefore, bit error is eliminated when a majority is taken. The illustration shown in FIG. 4 demonstrates how bit error is suppressed through majority processing, but it cannot be assumed that bit error will be eliminated in every case. In such cases, error-correction-decoder 17 performs error correction.

The present embodiment not only uses interleaving to randomize burst error caused by hits originating from, for example, multipath fading, but uses delay differential processing to further randomize the effect of burst error among diversity branches, and in addition, uses diversity branches to further suppress this random error through majority-discrimination processing. These operations are a form of time diversity, and majority discrimination is equivalent to diversity synthesis or diversity switching synthesis. Accordingly, in spread-spectrum transmission, diversity receiving through coding/multiplexing is enabled without resorting to space diversity using a plurality of antennas or an adaptive array, or frequency diversity.

Figure 5A:
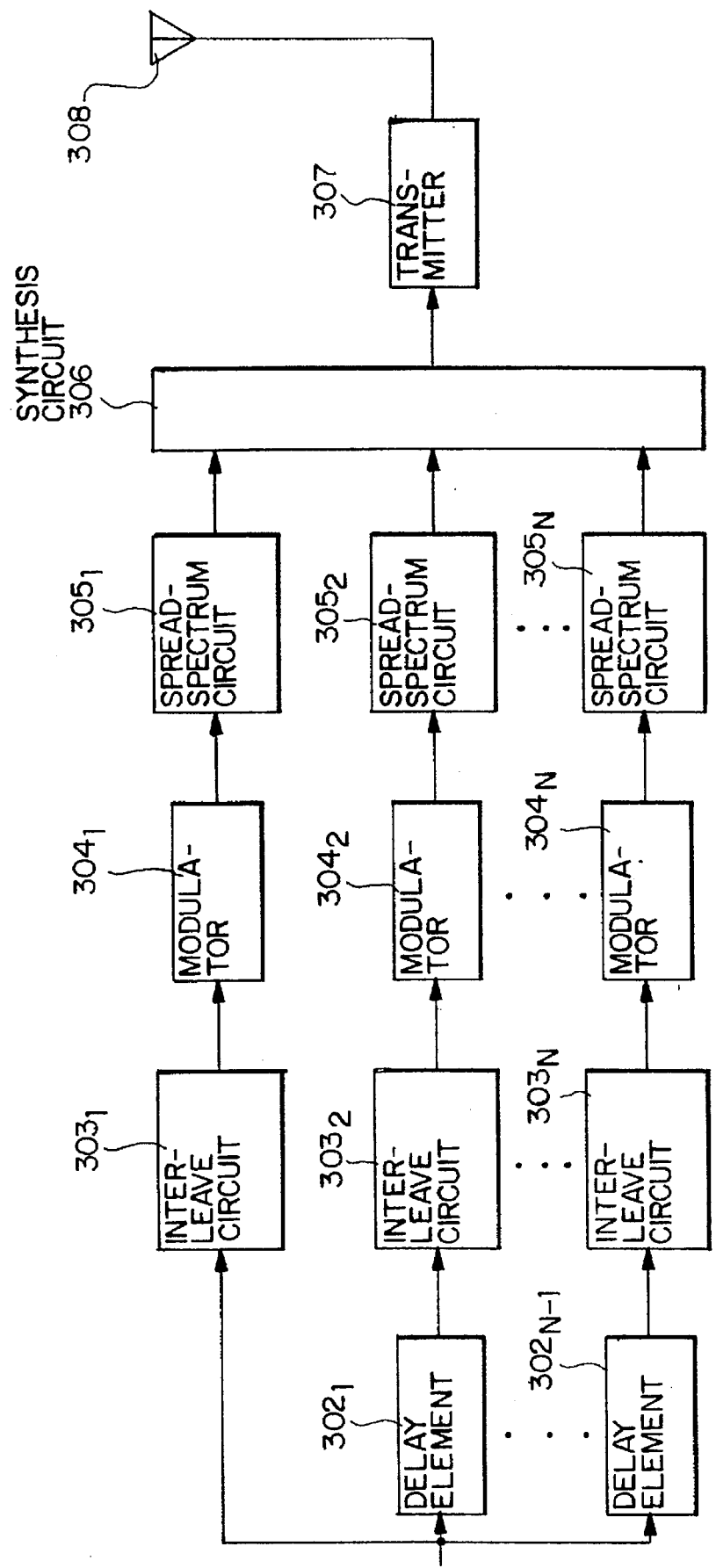
FIGS. 5A and 5B show the configurations of a transmitter and receiver of a diversity transmitter/receiver according to the second embodiment of the present invention.
Figure 5B:
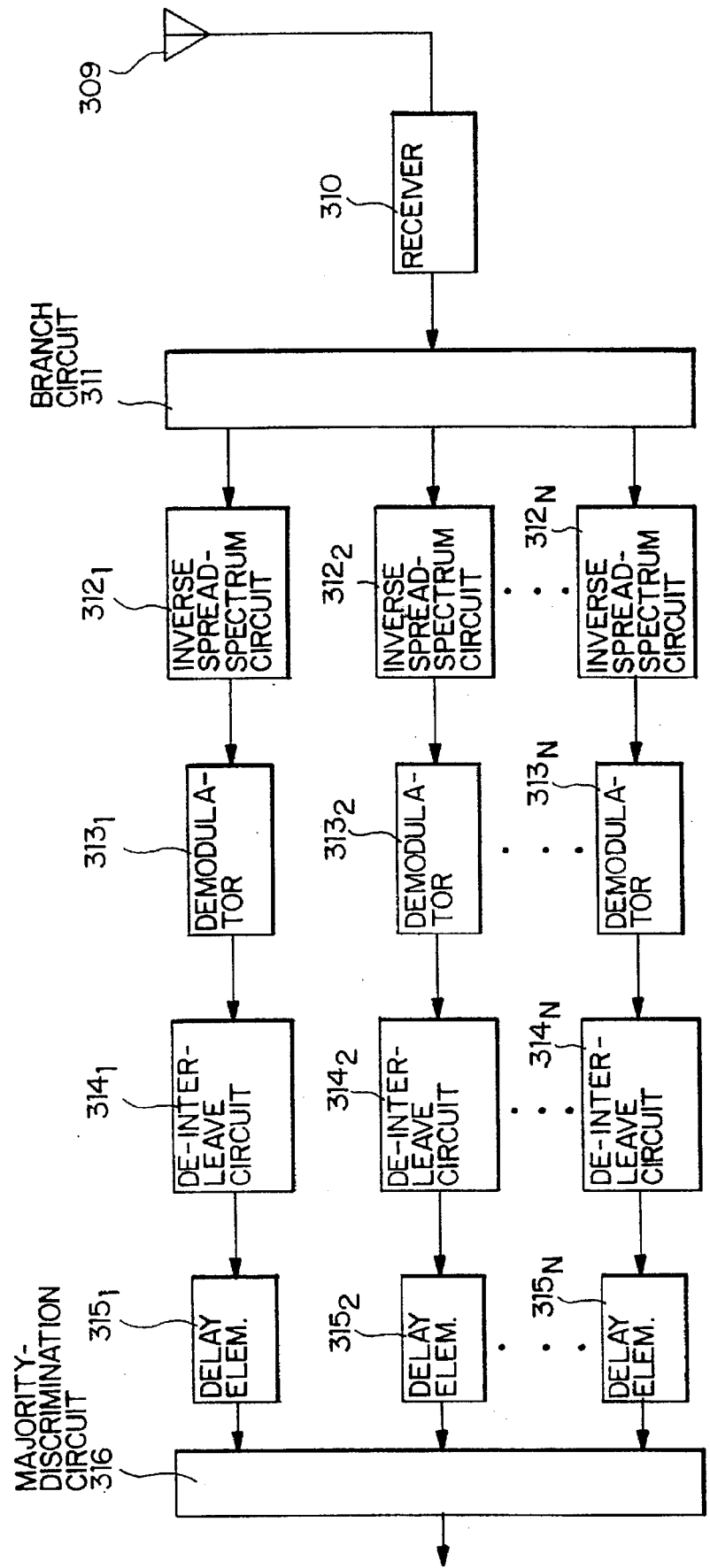

FIG. 5 shows the configuration of a spread spectrum diversity transmitter/receiver according to the second embodiment of the present invention.

The transmitter (FIG. 5A) is composed of (N−1) delay elements $302_1$–$302_{N-1}$, N interleave circuits $303_1$–$303_N$, N modulators $304_1$–$304_N$, N spread spectrum circuits $305_1$–$305_N$, synthesis circuit 306, transmitter 307, and transmission antenna 308.

The receiver (FIG. 5B) is composed of a reception antenna 309, receiver 310, branch circuit 311, N inverse spread-spectrum circuits $312_1$–$312_N$, N modulators $313_1$–$313_N$, N de-interleave circuits $3141$–$314_N$, N delay elements $315_1$–$315_N$, and majority-discrimination circuit 316.

The constituent elements of the present embodiment are each equivalent to constituent elements of the embodiment of FIG. 3 having reference numerals with the same ten-place and one-place numerals.

The present embodiment is the first embodiment shown in FIG. 3 with the error-correction coder 101 and error-correction decoder 117 omitted. As explained in the first embodiment, delay differential processing, interleave processing, and majority-discrimination processing for each diversity have the effect of suppressing bit errors. In series 211 shown in FIG. 4, bit errors have been eliminated. While bit errors cannot always be completely eliminated, the bit error ratio can clearly be improved significantly through majority discrimination as the number of diversity branches is increased. Accordingly, line quality can still be maintained even if error correction is omitted, and therefore, the error-correction coder and error-correction decoder have been removed from the present embodiment. In such a case, the added bits for error correction are not required, and line quality can be ensured through diversity alone without expanding the signal bandwidth. In other words, in consideration of a case in which frequency resources are limited, this embodiment is advantageous for effective use of frequency.

While preferred embodiments of the present invention have been described using specific terms, such description is for illustrative purposes only, and it is to be understood that changes and variations may be made without departing from the spirit or scope of the following claims.

What is claimed is:

1. A spread-spectrum diversity transmitter/receiver comprising:

(A) a transmitter that comprises
  (1) error-correction coding means for error-correction coding data to be sent,
  (2) delay means for conferring differing delay times to each branch signal derived by dividing output of said error-correction coding means into a plurality of branches,
  (3) interleave means for interleaving each branch output of said delay means,
  (4) modulating means for individually modulating each branch output of said interleave means,
  (5) spread-spectrum means for spreading the spectrum of each branch output of said modulating means by differing diffusion codes,
  (6) synthesizing means for synthesizing and coding/multiplexing the output of said spread spectrum means, and
  (7) transmitting means for transmitting the coded/multiplexed signal; and (B) a receiver that comprises
  (1) receiving means for receiving said coded/ multiplexed signal,
  (2) branching means for branching said received signal,
  (3) inverse spread-spectrum means for inverse-spreading the spectrum of each branch signal by means of said plurality of diffusion codes of said transmitting side,
  (4) demodulating means for individually demodulating each of the received signals of the plurality of branches that have been coded and separated by said inverse spread-spectrum means,
  (5) de-interleave means for executing de-interleaving which is the reverse process of said interleaving of said transmitting side upon said plurality of demodulated branches of received signals,
  (6) delay means for delay coordination of each branch output of said de-interleave means by conferring differing delay times to each so as to absorb delay differences between branches conferred by said delay means of said transmitting side,
  (7) majority-discriminating means for majority discrimination of each branch signal derived by said delay means, and
  (8) error-correction decoding means for performing error-correction decoding of said discrimination data of said majority-discrimination means.

2. A spread-spectrum diversity transmitter/receiver according to claim 1, wherein the delay means (A)(2) comprises N delay elements, N being an integer, wherein the first branch is set as a non-delayed branch, the second branch receives a delay of τ2 at the second delay element, and the Nth branch receives a delay of τN at the N−1 delay element.

3. A spread-spectrum diversity transmitter/receiver according to claim 2, further provided that delay times τ2, τ3 ... τN all differ from each other.

4. A spread-spectrum diversity transmitter/receiver according to claim 1, wherein the receiving means (B)(1) consists essentially of a single receiving antenna and a single receiver.

5. A spread-spectrum diversity transmitter/receiver according to claim 3, wherein N is 4.

6. A spread-spectrum diversity transmitter/receiver according to claim 1, wherein the output of the error-correction coding means (A)(1) is divided into branches and delay time differentials between the branches are applied through delay elements, such that the delay time differential between each of the branches is a length of 10 bits.

7. A spread-spectrum diversity transmitter/receiver according to claim 1, wherein the diversity branches are transmitted by coding/multiplexing at the same radio frequency.

8. A spread-spectrum diversity transmitter/receiver according to claim 1, wherein a single antenna is used for both the transmitting means (A)(7) and the receiving means (B)(1).

9. A spread-spectrum diversity transmitter/receiver comprising:
(A) a transmitter that comprises
  (1) delay means for conferring differing delay times to each branch signal derived by dividing transmission data into a plurality of branches,
  (2) interleave means for interleaving each branch output of said delay means,
  (3) modulating means for individually modulating each branch output of said interleave means,
  (4) spread-spectrum means for spreading the spectrum of each branch output of said modulating means by differing diffusion codes,
  (5) synthesizing means for synthesizing and coding/multiplexing the output of said spread spectrum means, and
  (6) transmitting means for transmitting said coded/multiplexed signal; and
(B) a receiver that comprises
  (1) receiving means for receiving said coded/multiplexed signal,
  (2) branching means for branching said received signal,
  (3) inverse spread-spectrum means for inverse-spreading the spectrum of each branch signal by means of said plurality of diffusion codes of said transmitting side,
  (4) demodulating means for individually demodulating each of the received signals of the plurality of branches that have been coded and separated by said inverse spread-spectrum means,
  (5) de-interleave means for executing de-interleaving which is the reverse process of said interleaving of said transmitting side upon said plurality of demodulated branches of received signals,
  (7) delay means for delay coordination of each branch output of said de-interleave means by conferring differing delay times to each so as to absorb delay differences between branches conferred by said delay means of said transmitting side,
  (8) majority-discriminating means for majority discrimination of each branch signal derived by said delay means.

10. A spread-spectrum diversity transmitter/receiver according to claim 2, wherein the delay means (A)(1) comprises N delay elements, N being an integer, wherein the first branch is set as a non-delayed branch, the second branch receives a delay of τ2 at the second delay element, and the Nth branch receives a delay of τN at the N−1 delay element.

11. A spread-spectrum diversity transmitter/receiver according to claim 10, further provided that delay times τ2, τ3 ... τN all differ from each other.

12. A spread-spectrum diversity transmitter/receiver according to claim 2, wherein the receiving means (B)(1) consists essentially of a single receiving antenna and a single receiver.

13. A spread-spectrum diversity transmitter/receiver according to claim 11, wherein N is 4.

14. A spread-spectrum diversity transmitter/receiver according to claim 2, wherein the diversity branches are transmitted by coding/multiplexing at the same radio frequency.

15. A spread-spectrum diversity transmitter/receiver according to claim 2, wherein a single antenna is used for both the transmitting means (A)(6) and the receiving means (B)(1).

* * * * *